Figure 1:
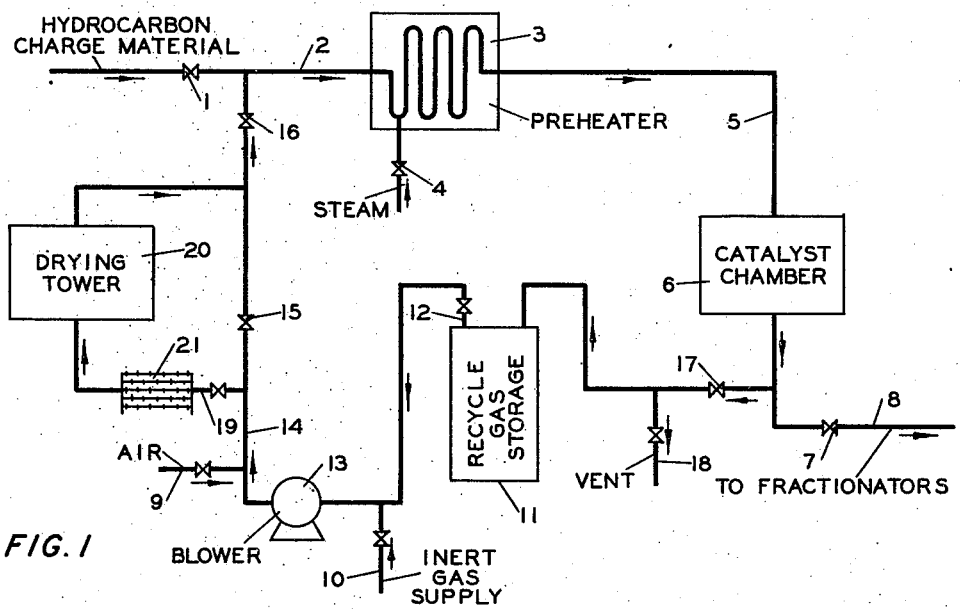

Aug. 20, 1946.  W. A. SCHULZE  2,406,112
PROCESS FOR CATALYTIC HYDROCARBON CONVERSION
Filed Feb. 10, 1942  2 Sheets-Sheet 1

INVENTOR
WALTER A. SCHULZE
BY
ATTORNEY

Patented Aug. 20, 1946

2,406,112

UNITED STATES PATENT OFFICE 2,406,112

PROCESS FOR CATALYTIC HYDROCARBON CONVERSION

Walter A. Schulze, Bartlesville, Okla., assignor to Phillips Petroleum Company, a corporation of Delaware Application February 10, 1942, Serial No. 430,282

6 Claims. (Cl. 196—52)

This invention relates to the catalytic conversion of hydrocarbons over contact catalyst masses. More specifically, it relates to a method of treating catalysts useful in promoting such conversions as cracking, reforming, dehydrogenation, cyclization, isomerization and the like, to improve their activity for said conversions and consequently the yield and quality of the conversion products. Still more specifically, the invention relates to hydrocarbon conversions wherein water-resistant catalysts are employed in the presence of steam as a diluent component of the hydrocarbon fluid undergoing treatment.

It has been noted that many types of catalytic reactions are adversely affected by the presence of even minute amounts of water in the reactant feed and/or in the catalyst. This condition has been attributed to a poisoning effect of water vapor on the catalysts employed. On the other hand, it has been found feasible to operate certain catalytic conversions over catalysts accordingly termed water-resistant catalysts with steam present in the feed as a diluent and to obtain desirable selective conversion and improved product quality and yield.

In catalytic processes wherein it has been found possible to use steam as a diluent and/or a heat carrier over water-resistant catalysts, it has heretofore been assumed that water has no effect on the catalyst activity, or that at the operating conditions employed, a favorable equilibrium is usually maintained between water in the catalyst and in the vapors undergoing conversion so that catalyst activity is at a satisfactory level. In the latter case, any shifts in said favorable equilibrium due to changing conditions is directly reflected in the activity of the catalyst. In the case of water-resistant catalysts, the favorable equilibrium is possibly restored, but in conversions of limited time periods, the time required for such restoration is an economic handicap to the process.

As the types of catalysts under consideration normally undergo loss of activity during use because of the deposition of contaminants such as tars, coke, etc., the conversion period is limited by the necessity for reactivation of the catalyst at stated intervals. The customary procedure for reactivation involves the passage of oxygen-containing gases through the catalyst to burn off the materials responsible for the deactivation, thereby forming principally carbon oxides and water vapor. During the reactivation period the conditions within the catalyst mass may be sufficiently changed from conversion conditions so that the water equilibrium maintained during the conversion period is disturbed and, in most cases, especially when a wet reactivation gas is used, it is usually found that the catalyst has adsorbed a large amount of water, the presence of which at least temporarily decreases the ability of even the water-resistant catalysts to promote the desired conversion.

An object of this invention is to increase the catalyst activity in catalytic reactions wherein steam is used as a diluent and/or a heat carrier.

Another object of this invention is to improve the conversions in catalytic reactions wherein water vapor is present in hydrocarbon feed stocks.

A further object of this invention is to provide a method wherein the water content of the catalyst in a catalytic conversion process is controlled so that the catalyst is substantially maintained at optimum activity with regard to its water content.

Still another object of this invention is to provide a process for the dehydration of water-resistant contact catalysts prior to use in hydrocarbon conversions to the extent that the equilibrium water content corresponding to optimum conversion conditions is substantially attained. Other objects and advantages will become apparent from the following disclosure.

I have found that even though steam may be an integral part of the charge mixture in catalytic reactions, higher conversions and a greater efficiency are obtained in said reactions when the catalyst is thoroughly dehydrated prior to putting it into service in the operating period. This dehydration of the catalyst is easily and most efficiently accomplished by treatment of said catalyst with a dry gas preferably at or near the end of a reactivation period. The only limitation of the dehydrating gas composition is that it should be substantially inert under the conditions employed and sufficiently dry to perform the required degree of dehydration at temperatures ordinarily in the range of conversion temperature.

Thus, the process of my invention comprises the steps of: (1) contacting a convertible hydrocarbon charge material, diluted with steam, with a catalyst performing the desired reaction, the operating conditions of temperature, pressure, flow rate, etc., being chosen to conform to values known to favor the particular conversion; (2) reactivating the catalyst after its activity has declined to an unfavorable level by contacting said catalyst with an oxygen-containing gas such as mixtures of air with steam, nitrogen, carbon dioxide or inert combustion gas, the operating conditions of temperature, pressure, and flow rate being chosen to prevent production of the combustion temperatures harmful to the catalyst; and (3) dehydrating the catalyst prior to commencing the conversion period to attain substantially the water content corresponding to conversion conditions.

To illustrate the steps in my process, reference will be made to the accompanying flow diagram of Figure 1.

The charge material from valve 1 and line 2 is led into the preheater 3 where vaporization and/or preliminary warming of said charge mixture takes place. Steam from line 4 is admixed with the charge in the preheater and the total charge mixture is then heated to the desired conversion temperature, after which it is led to the catalyst chamber 6 by means of the tranfer line 5. Reaction products are removed through valve 7 and line 8 from which they are led to the processing equipment such as fractionators, treaters, etc. When the catalyst activity decreases and regeneration becomes necessary, the charge material is cut off at valve 1, and then the steam is cut off at valve 4 after the catalyst chamber has been flushed of volatile hydrocarbons.

The reactivation gas containing the desired proportion of oxygen is made by mixing an oxygen containing gas such as air from line 9 with an inert gas. This inert gas may be carbon dioxide, nitrogen, steam, or any other suitable gas obtained from line 10, or it may be recycled reactivation gas which has been stored from previous regenerations in chamber 11 and is removed through line 12. The reactivation gas is forced by the blower 13 through line 14, valve 15, and 16, and through lines 2 and 5 into the catalyst chamber. The combustion products are taken through valve 17 and either vented through line 18 or recycled and/or stored in vessel 11 for further use in an inert recycle gas.

Dehydration of the catalyst may be accomplished by means of one of the following alternative methods. The reactivation gas mixture used near the end of the burning period may be dried to the desired dew point by by-passing either all or part of said regeneration gas through line 19, cooler 21, and drying tower 20. Or, dehydration of the catalyst may be accomplished after the reactivation is complete by drying either the air, the inert gas, the recycle gas, or any combination of these gases, and passing said gas preheated to the desired temperature through the catalyst chamber.

In many instances, dehydration is preferably accomplished by means of the recycled reactivation gas so that the dehydration becomes effectively a part of the reactivation operation. In this manner, the final stages of reactivation and/or the dehydration essential to the present invention may be performed simultaneously or in uninterrupted sequence. Near the end of the reactivation period, the amount of water formed by the reactivating combustion is small, and the recycled gas is readily dried after suitable cooling ahead of the drying tower. Further, when air (or oxygen) addition is halted at a suitable interval prior to completion of the reactivating combustion, the recycled gas may serve simultaneously as inert purge gas and dehydrating agent.

The preferred temperature maintained in the catalyst during the drying step is usually within or somewhat above the range used for the conversion step in order that the change from the drying to conversion step may be made with the minimum amount of delay and the catalyst bed thus brought to conversion conditions. Somewhat higher temperatures in or near the preferred conversion range may be employed for the drying step in order to speed up the dehydration process and to attain a more efficient dehydration. The maximum preferred temperature is about 1300° F., while it is ordinarily expedient to employ temperatures above about 500° F. to obtain substantially complete dehydration. This temperature may be obtained by heating the drying gas in preheater 3 to these temperatures and, if necessary, supplying external heat to and/or insulating chamber 6. The pressures employed for the dehydration step are usually the same as that employed for the reactivation step and may be anywhere in the range of atmospheric to 1000 pounds per square inch.

The drying tower 20 employed in the process is charged with any desiccant capable of producing the desired dew point lowering of the gas stream without transferring any contaminants to the dried gas. For this purpose solid adsorbent desiccants are preferred because of the efficiency of dehydration obtained at relatively high flow rates and the ease with which the solid desiccants may be reactivated. Materials suitable for the purpose include bauxite, brucite, activated alumina, silica gel and the like, either alone or in some cases bearing hydrate-forming metal salts.

The inlet gas to the drying tower is preferably cooled at temperatures which permit rapid and extensive adsorption of water by the desiccant, and usually between atmospheric and about 200° F., depending on the desiccant employed. Higher temperatures decrease the adsorptive capacity of the desiccant and hence are usually undesirable. On the other hand, excessively low temperatures obviously increase the cooling and heating requirements before and after drying tower. A pre-cooler may be employed which may condense and remove part of the water present in the inlet gas. The gas stream is also preferably compressed to maximum system pressure ahead of the drying step to aid in water removal.

Since the process of my invention is applicable generally to conversions over contact masses wherein steam is used as a diluent and/or heat carrier, it may be utilized with a great variety of charge stocks and catalytic materials, and under a wide range of operating conditions. For example, this process is especially applicable to hydrocarbon conversions and has proven valuable in such reactions as dehydrogenation, cracking, isomerization, aromatizations, and the like. The operating conditions, in the specific instances, are chosen to conform to values known to favor the particular conversion. Thus, catalytic gas oil cracking processes may be operated at temperatures of from about 850 to about 1050° F. and moderate superatmospheric pressures of 50 to 500 pounds gage, while olefin dehydrogenation may require temperatures of from about 1000 to about 1300° F. and pressures of atmospheric to 100 pounds gage.

Likewise, the contact catalyst useful in my process are those having activity in promoting the desired reaction under the above-described conditions. For cracking, dehydrogenation, aromatization, and similar reactions, those rugged mineral ore materials comprising bauxite, brucite, various clay-type minerals, and active aluminum silicates have been found to be particularly useful. These natural water-resistant catalysts may be used after activation by various means and/or may be promoted by the addition of minor amounts of active metals or metal salts or oxides. Also found useful are such natural or synthetic materials as zirconia, titania, magnesia, alumina, and various silica-alumina, and other combinations. These latter may also be promoted with minor quantities of metal oxides, particularly those of chromium, nickel, and zinc.

The advantage of the present invention are exemplified notably in such diverse hydrocarbon conversions as the catalytic dehydrogenation of low-boiling aliphatic olefins and the catalytic cracking of heavy hydrocarbon liquids. In such processes, even though the hydrocarbon charge in the conversion period may contain appreciable quantities of water vapor, there is a marked improvement in operation when the catalyst is dehydrated prior to the conversion period.

Figure 2:
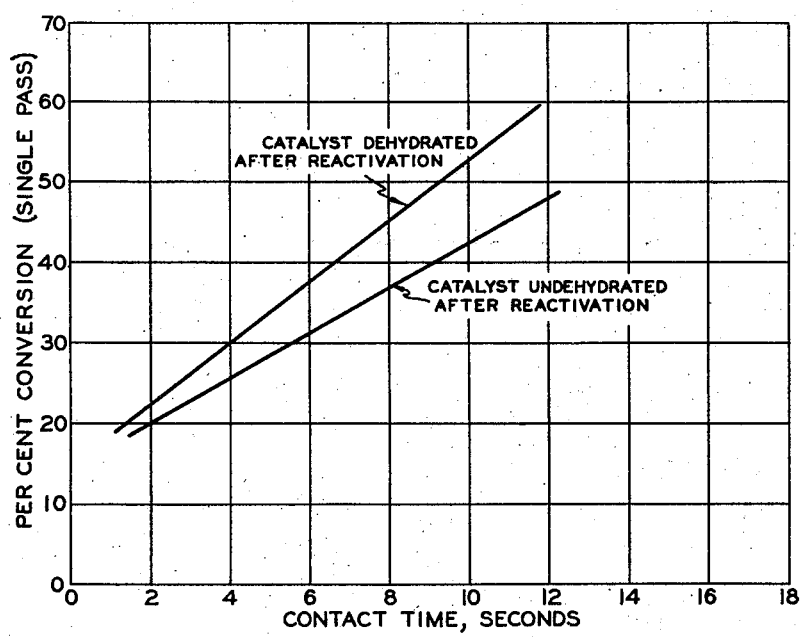

The magnitude of the improvements obtained by the process of this invention are shown graphically in Figure 2. The curves of Figure 2 represent the relationship between contact time and conversion in the catalytic cracking of a gas oil as determined for a reactivated catalyst dehydrated before the conversion period and a reactivated catalyst placed on stream without dehydration. The gas oil stock charged to the catalyst was mixed with steam as diluent and heat carrier and the catalyst temperature was held constant. The curves show clearly the superior results obtained with the dehydrated catalyst.

The benefits of dehydration as shown in Figure 2 may be interpreted in a number of ways. For example, it is seen that at constant contact time (and hydrocarbon flow rate) the conversion is increased by the dehydration step. Alternately, it may be shown that at a constant conversion level, the requisite contact time is decreased and the corresponding hydrocarbon flow rate may be increased. Thus, the present invention may be utilized to attain higher conversion at a given charge rate or equivalent conversion at a higher charge rate, whichever may be more economical.

An important feature of the increased conversion produced by the present invention is that it is apparently largely due to increased catalyst activity in the initial portion of the conversion period. It is often found that high activity at this initial point is responsible for a notable improvement in product quality as well as yield. This improvement is reflected in turn in the total product of the conversion period since a larger proportion of the total product is obtained at higher catalyst activity. For example, the octane rating of stabilized gasoline produced from conversion of gas oil over a dehydrated catalyst may be from 0.5 to 2.5 units higher than that obtained from conversion under identical conditions over a catalyst which is undehydrated after reactivation. Further, although the undehydrated catalyst may be slowly dehydrated by the hot flowing vapor stream in the initial portion of the conversion period, the consequent slow activity rise is overbalanced by a somewhat accelerated rate of deactivation in the conversion service, and the average activity for a conversion period is substantially lower for an undehydrated catalyst.

The following examples illustrate the operating features and improved results obtainable by my invention when applied to specific hydrocarbon conversions.

Example I

Two comparative catalytic gas oil cracking operations on a charge having gravity of 34° A. P. I. and a boiling range of 430 to 725° F. were conducted over a bauxite catalyst. In both cases the charge mixture, consisting of steam and the gas oil in the mole ratio of 7:1, was heated to 950° F. and passed into the catalyst chamber at the rate necessary to produce a contact time of six seconds between the hydrocarbon and the catalyst. The pressure was 75 pounds per square inch. The first experiment (Run I) was made with a reactivated catalyst which had been dehydrated by the passage over said catalyst of dried recycled reactivation gas at 1000° F. for one-half hour, whereas in the second run, no attempt was made to dehydrate the catalyst following reactivation. The results are recorded in the following table and are shown graphically in Figure 3.

| Hours on stream | Per cent gas oil converted | |
| --- | --- | --- |
|  | Dehydrated catalyst (I) | Undehydrated catalyst (II) |
| 0.5 | 45 | 24 |
| 1 | 41 | 29 |
| 2 | 39 | 32 |
| 3 | 37 | 33 |
| 4 | 36 | 32 |
| 5 | 35 | 31 |
| 6 | 35 | 31 |
| Average for the 6 hours | 38 | 31 |

Figure 3:
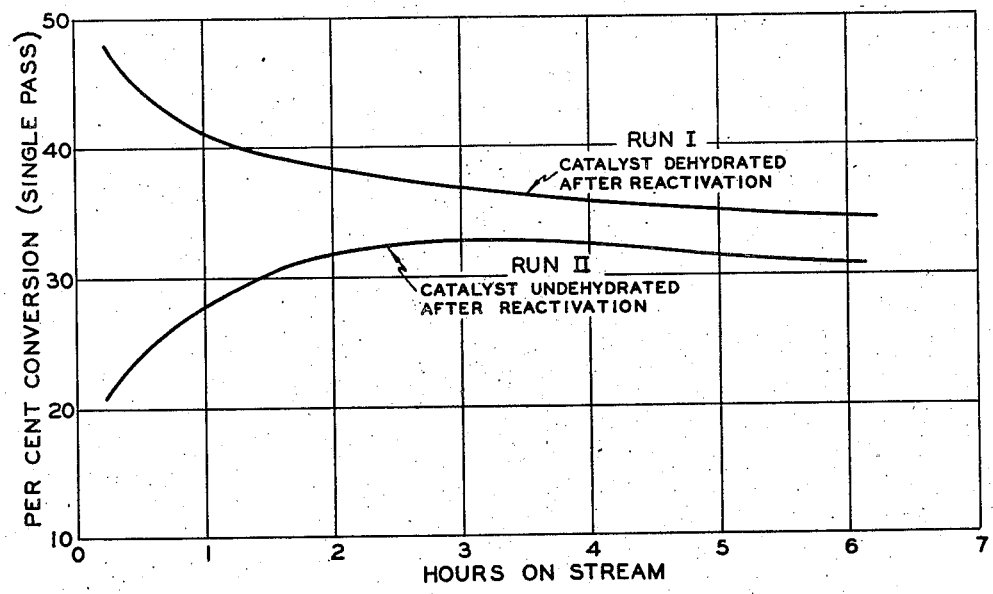

It is seen from the curves of Figure 3 that not only is the average conversion higher in the case of the dehydrated catalyst, but the conversions with respect to time follow different patterns. With the dehydrated catalyst, high conversions are obtained at the beginning followed by a somewhat gradual decrease to a relatively constant value. On the other hand, with the undehydrated catalyst the initial conversions are low, a rise to an inferior maximum is obtained, and then a gradual leveling off is observed. At no point is a conversion level reached with undehydrated catalyst that is as high as values obtained with the dehydrated catalyst. In Run I, 91 per cent of the converted material was recovered as stabilized end point gasoline having an A. S. T. M. octane rating of 79.1, while in Run II only 86 per cent of the converted material was stabilized end point gasoline and the A. S. T. M. octane number was only 78.2. These product comparisons show the improved quality and higher gasoline yield obtained along with greater conversion over the dehydrated catalyst.

Example II

Figure 4:
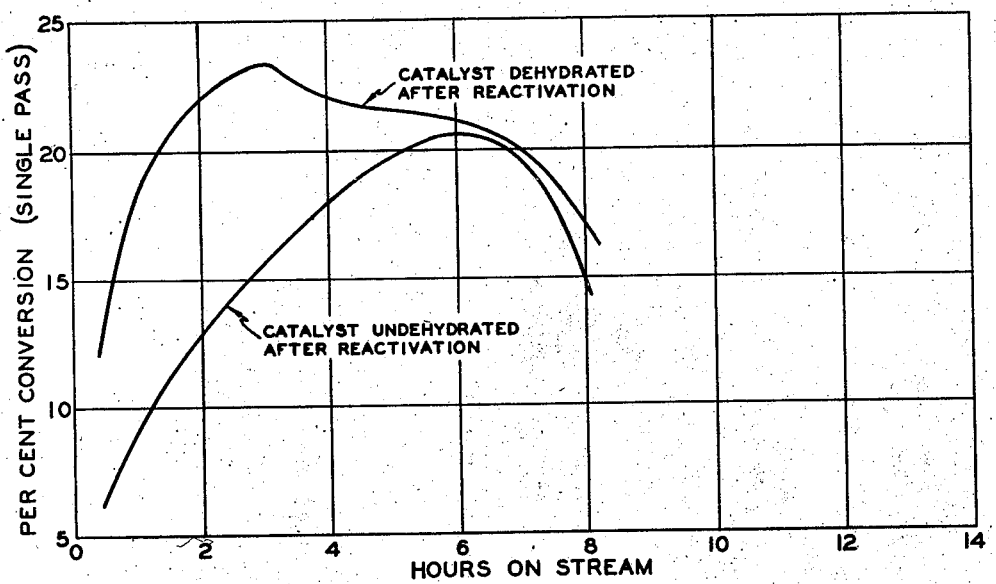

A butene dehydrogenation reaction was carried out with a catalyst consisting of bauxite impregnated with five weight per cent of barium hydroxide. The charge mixture, consisting of three parts steam and one part butene, was preheated to 1185° F. and passed into the catalyst chamber at slightly above atmospheric pressure. The contact time between the hydrocarbon and the catalyst was about 0.5 second. Figure 4 graphically depicts the advantages obtained when the catalyst is dehydrated according to the process of this invention. When the catalyst was dehydrated, the maximum yield of butadiene per pass was quickly reached and a high yield of butadiene was maintained for approximately a seven hour period. When the dehydration step was omitted a long induction period was found to occur; that is, the initial yield of butadiene was much lower than in the previous case, and the diolefin production rose slowly with time. The maximum yield was attained only after about six hours on stream, at which point the catalyst was near the end of its useful conversion life prior to reactivation. With the more active dehydrated catalyst, the average butadiene yield per pass was 19.5 per cent and the corresponding conversion was 40 per cent of the butene charged, whereas with undehydrated catalyst, the average butadiene yield per pass was only 15.5 per cent with a total conversion of 36 per cent of the butene charged.

It is thus seen from the above description of my invention that a catalyst used in a conversion process wherein steam is employed as a diluent can be made more active by causing said catalyst to be dehydrated before use on the conversion step. This dehydration can be made simply and easily with a minimum of extra cost, and any small time increment added to the reactivation period is well compensated for by the increased conversions and yields of the desired products. In fact, the time requirement is substantially eliminated when the dehydration step accomplishes a final purging of the reactivated catalyst of oxygen prior to the conversion period, and a separate purging step is thus unnecessary. This invention has a further advantage in processes such as catalytic cracking where not only better conversions are obtained but also desirable properties of the product, such as octane rating, etc., are enhanced.

While the foregoing description and exemplary operations have been relatively specific with regard to certain preferred applications of the process, it will be obvious that the essence of this invention is of a wide scope. Thus, while specific examples have dealt with embodiments utilizing large quantities of steam in the hydrocarbon charge, it will be obvious that the principles and operating methods disclosed are likewise applicable to all processes wherein the equilibrium between water vapor in the feed stream and in the adsorbent-type catalyst at conversion conditions is an appreciable factor governing catalyst activity. Such processes may range from those in which feed stocks contain only traces of water to those in which water vapor is a major proportion of the feed vapors. The present invention may also be applied to conversion processes in which the water vapor equilibrium over the catalyst is unfavorably affected by operations other than reactivation, such as when water is formed by the conversion reaction. Further, while the above-described operations have dealt with the dehydration of a catalyst mass subsequent to reactivation, it will be apparent that similar benefits may be obtained through substantially equivalent dehydration of a freshly prepared catalyst prior to the first conversion period. These and other modifications and extensions of the process of the present invention will be apparent from the foregoing disclosure, and no limitations are extended except as expressed in the appended claims.

I claim:

1. A process for the catalytic conversion of a hydrocarbon fluid which comprises contacting said fluid in admixture with water vapor as a diluent and heat carrier, at conversion conditions of temperature, pressure, and flow rate, with a water-resistant contact catalyst to effect conversion of a substantial proportion of said hydrocarbon fluid; interrupting the hydrocarbon flow at the end of the conversion period and after the deposition of a deactivating proportion of carbonaceous material upon said catalyst; purging the catalyst space of hydrocarbons; reactivating the catalyst by passing therethrough an oxygen-containing reactivation gas under combustion conditions at a temperature, pressure, and flow rate chosen to prevent production of combustion temperatures harmful to the catalyst for the removal of said carbonaceous material by combustion with the concomitant formation of water vapor as a product of said combustion; substantially completely dehydrating the reactivated catalyst, and removing water formed during the reactivation therefrom, by passing through the catalyst subsequent to said reactivation a substantially dehydrated gas at elevated temperatures, and thereby improving the activity of the catalyst for a subsequent conversion of hydrocarbon fluid in the presence of water vapor; and utilizing said reactivated and dehydrated catalyst in said subsequent conversion.

2. A process according to claim 1 in which the hydrocarbon fluid comprises heavy hydrocarbon oil and the conversion reaction is catalytic cracking carried out at a temperature of from about 800° F. to about 1050° F.

3. A process according to claim 1 in which the hydrocarbon fluid is an n-butene and in which the conversion is dehydrogenation carried out at a temperature of from about 1,000° F. to about 1,300° F.

4. A process as in claim 1 wherein the reactivated catalyst is dehydrated by the passage therethrough of the recycled reactivation gas stream which is cooled, dried by contact with a bed of solid adsorbent desiccant, and reheated to substantially conversion temperature prior to reintroduction to the catalyst.

5. A process as in claim 1 wherein the catalyst is dehydrated by the passage therethrough of a stream of substantially inert gas substantially completely dehydrated by contact with a bed of solid desiccant and heated to substantially conversion temperature, whereby the catalyst is simultaneously purged of oxygen, heated to conversion temperature and dehydrated to produce maximum activity.

6. A process according to claim 1 in which the hydrocarbon fluid is an n-butene, the catalyst is bauxite impregnated with barium hydroxide, and the conversion is dehydrogenation carried out at a temperature of from about 1000° F. to about 1300° F.

WALTER A. SCHULZE.